United States Patent Office.

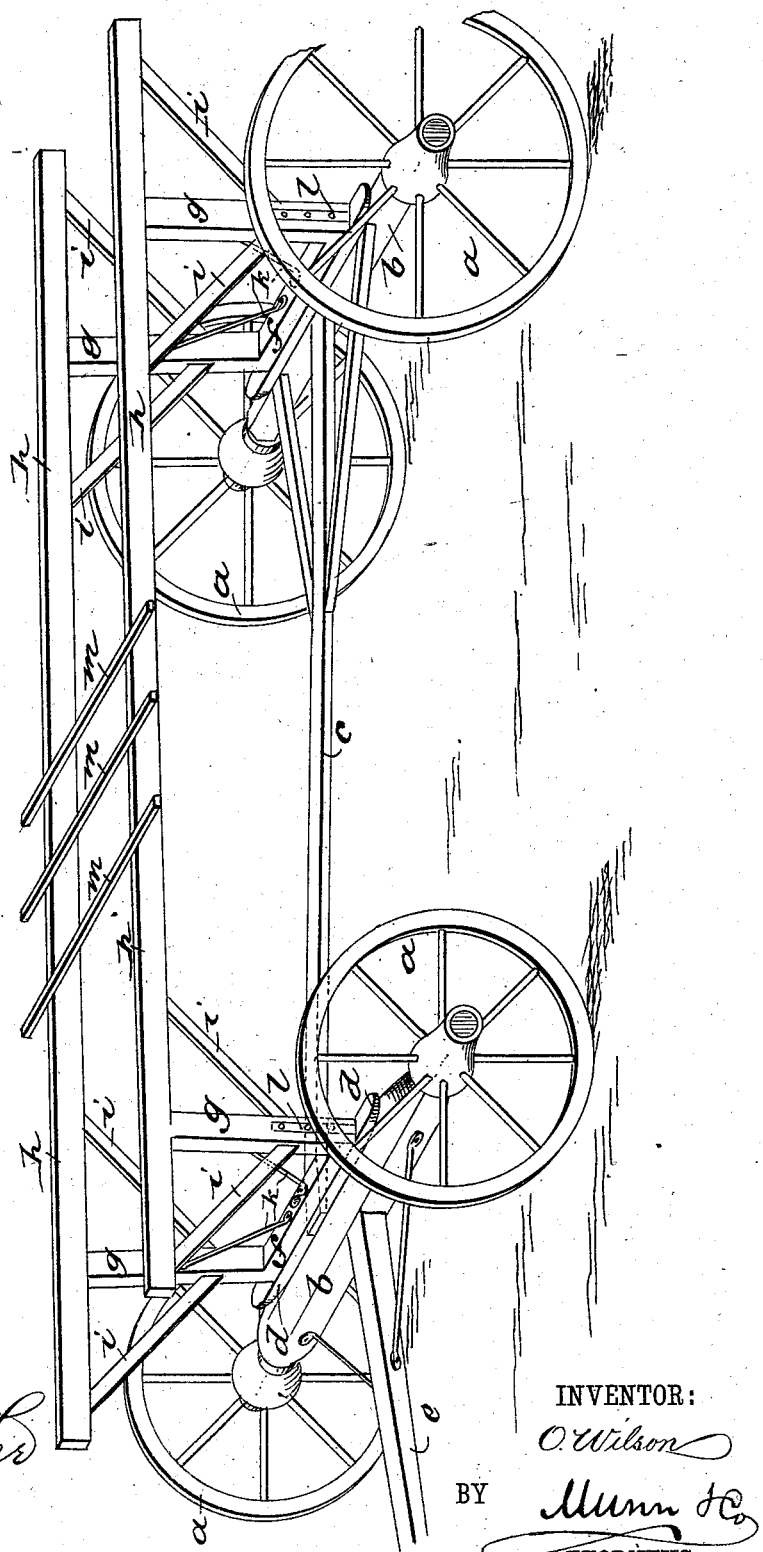

OBADIAH WILSON, OF PLAINVILLE, NEW YORK.

RACK AND TRUCK.

SPECIFICATION forming part of Letters Patent No. 290,160, dated December 11, 1883.

Application filed July 17, 1883. (No model.)

*To all whom it may concern:*

Be it known that I, OBADIAH WILSON, of Plainville, in the county of Onondaga and State of New York, have invented a new and Improved Combined Tobacco Rack and Truck, of which the following is a full, clear, and exact description.

The object of my invention is to facilitate the handling of tobacco-plants without injury to the plants after they have been cut from the field, and while conveying them to and storing them in the drying-house.

Reference is to be had to the accompanying drawing, forming part of this specification, and in which the figure is a perspective view of my improved rack and truck.

In carrying out my invention, I provide any approved truck of wheels $a$ on the front and rear axles $b$, and a reach, $c$, which has any suitable connection with the hind axle and the bolster $d$ of the forward axle, to connect the axles and allow free swing of the forward wheels in turning. The truck may be fitted with a pole, $e$, or any other suitable draft connections, as desired. On the hind axle $b$, and also on bolster $d$, I support a frame of U-form, composed of a sill-plate, $f$, and end posts, $g$, rising from the ends of plates $f$, and boxed or framed to the sills in any suitable manner. On the tops of posts $g$, which I propose to make about three feet high, I fasten the main rack-bars $h$, which I make more secure by angle-braces $i$, connecting bars $h$ with the posts $g$ at the front and rear faces of the posts, which latter I support from the sills $f$ by the braces $k$, as shown. I propose to make the frames $f g$, so as to support the bars or rails $h$, about four feet apart, said bars $h$ being preferably about eighteen feet long, so that the complete rack of frames and bars $f g h$ shall be of convenient size to be supported by an ordinary box-wagon truck, which may thus be utilized to draw the tobacco-rack when required; and I shall stay the rack to the truck sidewise by the irons $l$, rising from the hind axle and bolster $d$, and let into gains or mortises of the sills and posts $f g$; or any suitable dowel-pins or other stays may be employed for the purpose.

In using my improvement, the combined rack and truck will be drawn to the field, and as the plants are harvested they will be hung from the short bars or laths $m$ by cords, clips, or other approved devices commonly employed for suspending the plants in the drying-house, and the bars $m$ will be laid across the rack-bars $h$, and as bars $m$ will hold from eight to ten plants, and as the rack-bars $h$ will hold one hundred or more of the loaded bars $m$, a large number of the plants may be carried at once, and on reaching the dry-house the bars $m$ may be transferred with the plants, as first hung on them, direct to the dry-house racks, where the seasoning process may be completed, a single handling only of the plants being required by my method and apparatus to transfer the growing plants to the dry-house, which not only avoids the bruising of the plants now so common, but effects an important saving of time and labor, which permits the cultivation and curing of a larger crop at less expense.

I do not abandon or dedicate to the public any patentable features set forth herein and not hereinafter claimed, but reserve the right to claim the same either in a reissue of any patent that may be granted upon this application or in other applications for Letters Patent that I may make.

Having thus described my invention, what I claim as new, and desire to secure by Letters Patent, is—

The combination of a four-wheeled running-gear, an upright frame, $f g i$, over each axle, and two straight parallel bars, $h h$, the latter arranged at such distance apart on the upright frames as to hold the ordinary tobacco-sticks, as shown and described.

OBADIAH WILSON.

Witnesses:
 JOHN BRATT,
 J. H. MORTON.